(12) United States Patent
Kennedy

(10) Patent No.: US 10,941,888 B2
(45) Date of Patent: Mar. 9, 2021

(54) HYDRANT ADAPTER WITH STAINLESS DRAIN

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 341 days.

(21) Appl. No.: 16/016,940

(22) Filed: Jun. 25, 2018

(65) Prior Publication Data

US 2019/0390805 A1    Dec. 26, 2019

(51) Int. Cl.

| F16L 25/14 | (2006.01) |
| F16L 43/00 | (2006.01) |
| A62C 35/20 | (2006.01) |
| C22C 9/02 | (2006.01) |
| E03B 7/02 | (2006.01) |
| B22C 9/24 | (2006.01) |

(52) U.S. Cl.
CPC .............. *F16L 25/14* (2013.01); *A62C 35/20* (2013.01); *B22C 9/24* (2013.01); *C22C 9/02* (2013.01); *E03B 7/02* (2013.01); *F16L 43/00* (2013.01)

(58) Field of Classification Search
CPC ............ F16L 25/14; F16L 43/00; A62C 35/20
USPC .......................... 285/179, 13–14, 94; 137/272
See application file for complete search history.

(56) References Cited

U.S. PATENT DOCUMENTS

| 1,275,532 A | * | 8/1918 | Conran | F16L 45/00 285/126.1 |
| 1,844,047 A | * | 2/1932 | Smittle | F16L 19/0218 285/281 |
| 2,143,279 A | * | 1/1939 | Osborn | F16L 21/08 285/37 |
| 3,082,844 A | * | 3/1963 | MacDonald, Jr. | F16L 39/02 184/6 |
| 3,441,055 A | * | 4/1969 | Pickell | E03B 9/02 137/614.06 |
| 3,845,779 A | * | 11/1974 | Greene, Jr. | F16K 15/20 137/209 |
| 5,263,312 A | * | 11/1993 | Walker | F02C 7/25 285/13 |
| 7,128,091 B2 | * | 10/2006 | Istre, Jr. | F16L 37/252 137/515.5 |
| 7,992,585 B2 | * | 8/2011 | Fitzpatrick | F16K 27/006 137/15.02 |

(Continued)

*Primary Examiner* — Matthew Troutman
*Assistant Examiner* — Fannie C Kee
(74) *Attorney, Agent, or Firm* — Brown & Michaels, PC

(57) ABSTRACT

Provided is an adapter and a method of making the same. The adapter includes threads to connect a fire hydrant to one end of a fire hydrant elbow having a different scale than the fire hydrant, the fire hydrant elbow being connected at a second end to an underground water pipe. The adapter also includes at least one stainless steel tube extending at a first end thereof from a corresponding at least one port hole formed through a lower end of an inner surface of the adapter and a second end thereof extending through a corresponding at least one port hole formed through an approximate middle portion of an outer surface of the adapter. The corresponding port holes through the inner surface of the adapter and the outer surface of the adapter being in vertical alignment.

12 Claims, 6 Drawing Sheets

Section A-A

(56) References Cited

U.S. PATENT DOCUMENTS

2015/0323113 A1\* 11/2015 Booher, Sr. ......... F16C 33/6659
　　　　　　　　　　　　　　　　　　　　　　285/94

\* cited by examiner

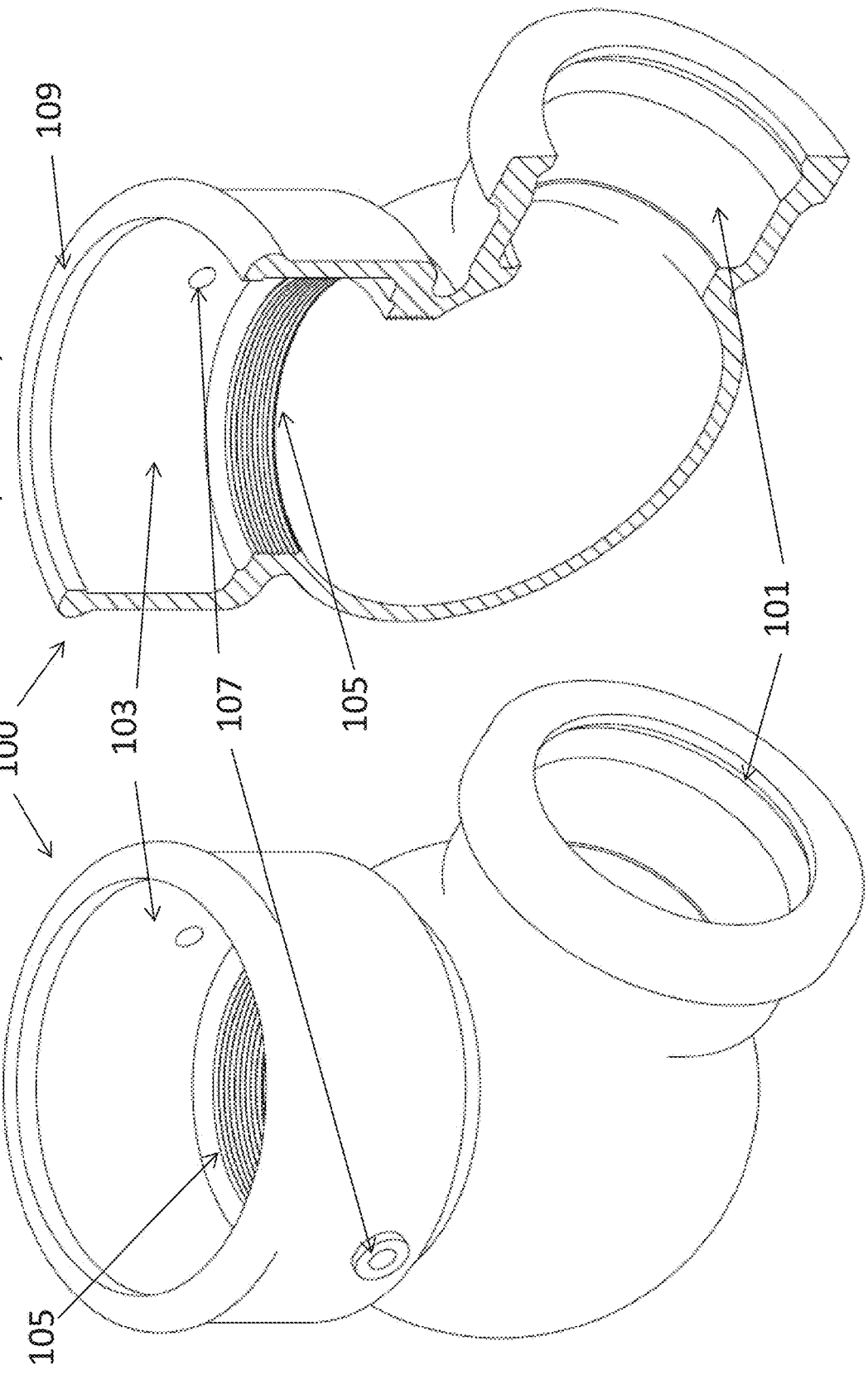

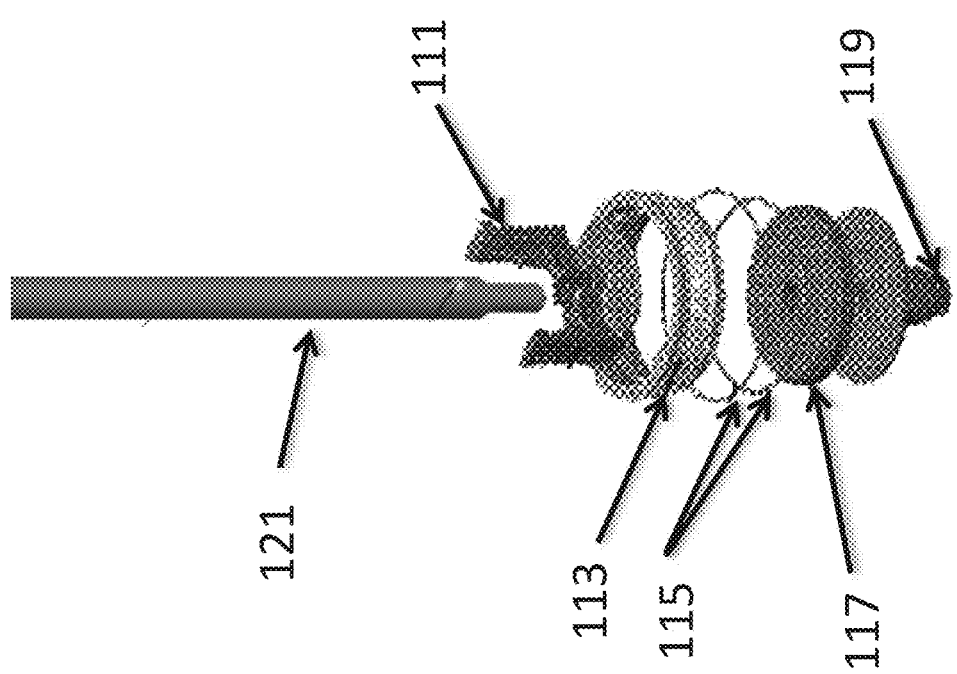

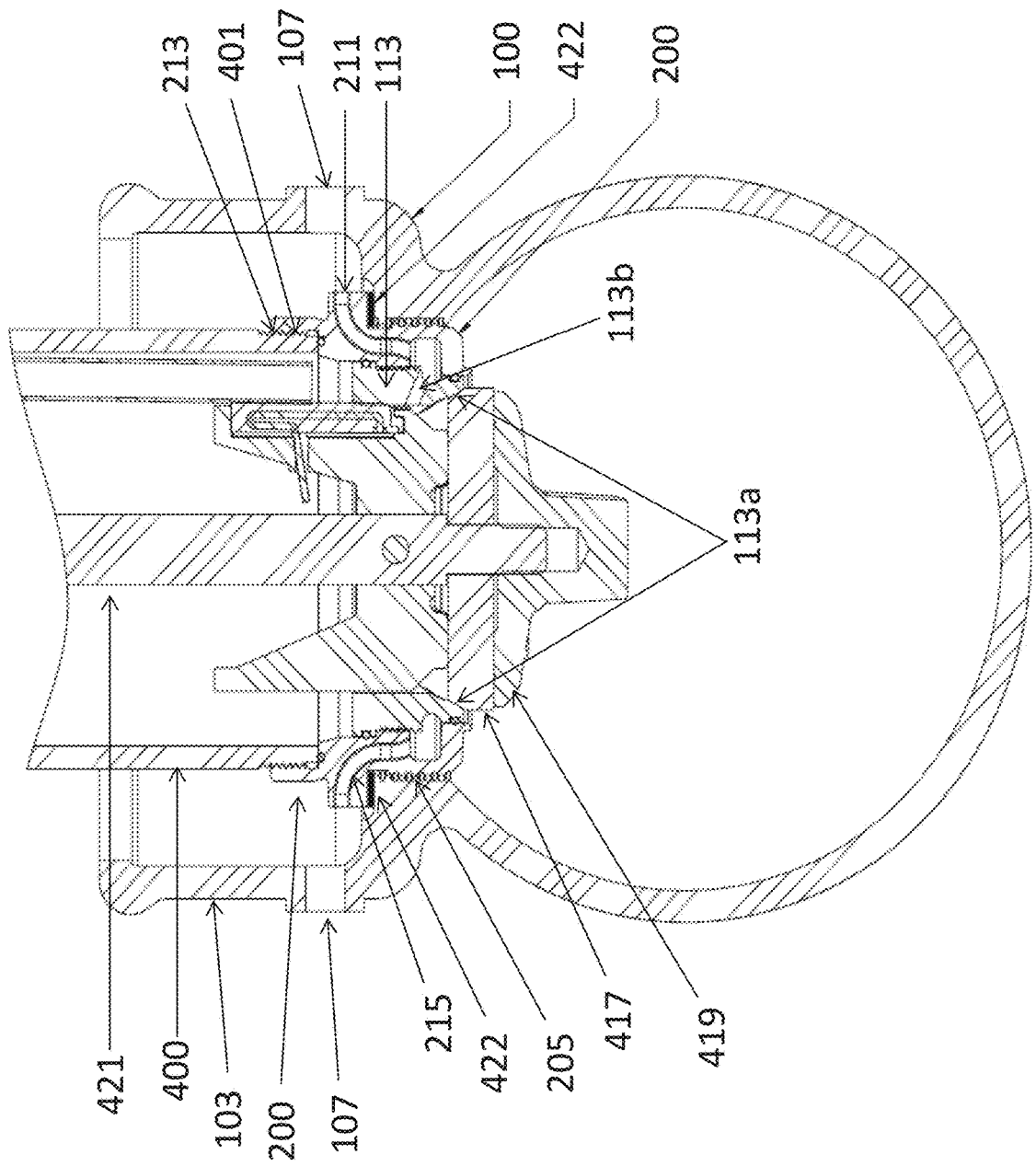

HYDRANT ADAPTER WITH STAINLESS DRAIN

BACKGROUND OF THE INVENTION

Field of the Invention

The inventive concept pertains to the field of fire hydrants. More particularly, the inventive concept pertains to an adapter for adapting modern fire hydrants with conventional old-style fire hydrant elbows connected at one end to an underground water pipe.

Description of Related Art

Many conventional "old-style" fire hydrants begin with an elbow extending from a bottom portion thereof and connecting to an underground water pipe that supplies water from a water source. These elbows were often connected to the underground water pipes many years or even decades ago, and usually by using lead to form a leaded joint. These underground leaded joints are very difficult to replace since it would require digging up the ground in which the water pipes and elbows are buried and disassembling the connection between the elbow and the water pipe, which would require cutting the old pipes, thus causing new problems.

FIG. 1A illustrates an example of a conventional cast iron elbow 100 to be connected to conventional fire hydrants. A first open end 101 of the elbow 100 connects to the underground water pipes by way of clamps, crimps, etc. A second open end 103 of the elbow 100 is formed at the opposite end to connect with a bottom end of a conventional fire hydrant (not illustrated for brevity of the detailed description). The conventional style elbows 100 and corresponding conventional fire hydrants were formed such that the bottom end of the fire hydrant included outer threads formed therein to thread into inner threads 105 of the conventional style elbows 100.

FIG. 1B illustrates a cross-sectional view of the example conventional style elbow of FIG. 1A. As illustrated in FIG. 1B, the threads 105 within the elbow 100 were formed at an inner lower circumference of the second open end 103 of the elbow 100. The corresponding threads formed at the outer surface of the bottom end of the conventional style fire hydrants extend into the second open end 103 of the elbow 100 and engage with the threads 105. These old-style style fire hydrants were manufactured of cast iron, and because they were exposed to the environment for many years, they faced various types of environmental conditions including freezing temperatures, rain, heat, and other natural elements. Also, these old-style fire hydrants break down over time as the seals in the main valve deteriorate, thus requiring replacement. As a result of such wear, these old-style fire hydrants tend to become inoperable long before the old-style elbows 100, which receive protection from such environmental conditions as a result of being buried almost completely underground. Only a top portion 109 of the second open end 103 is exposed to receive a hydrant. These old-style elbows 100 also include drain holes 107 to allow excess water sitting within the fire hydrant to drain out in order to prevent water from remaining within the hydrants when the hydrants are closed. Thus, these drain holes 107 prevent water from freezing in the hydrants during below-freezing temperatures, which could break the fire hydrants as the freezing water expands.

FIG. 1C illustrates an example of internal components of more modern fire hydrants. The internal components can include a drain valve 111, a seat ring 113, a pair of O-rings 115, a main valve 117, a bottom plate 119 and a stem 121. Other parts may also be used, but are not illustrated here in order to provide brevity of this application, and are not part of the inventive concept. The bottom end of the stem 121 extends through the drain valve 111 and the main valve 117 to fit into a center hole in the bottom plate 119, where the bottom end of the stem 121 is fastened to the bottom plate 119. Thus, rotation of the stem 121 in one direction moves the bottom plate 119, and hence the main valve 117 upward until the main valve 117 presses up against a tapered bottom (not illustrated) of the seat ring 113 to close off a water flow from a water source up into the fire hydrant. The O-rings 115 are positioned between the seat ring 113 and the member in which the seat ring 113 is threaded to so that water does not flow between the seat ring 113 and the member when the main valve 117 is raised to close off water flow into the hydrant.

The conventional style elbows 100 and corresponding fire hydrants (not illustrated) were manufactured many years ago, and are no longer being manufactured. However, the conventional style elbows 100 are still in use today mostly because they are protected from naturally corrosive environmental elements and damage caused by blunt force occurring above ground. Moreover, although old and outdated, these old style elbows are costly and difficult to remove from the underground pipes to which they were connected to years ago.

Another problem that arises is that the threads 105 within the open end 103 of these old-style elbows 100 do not fit fire hydrants that are presently being manufactured due to modern requirements and an increased efficiency of present day fire hydrants. Accordingly, there is a need for a device, such as an adapter, that can securely receive outer threads of a bottom portion of present-day manufactured fire hydrants and also be able to engage with the threads 105 of the conventional old-style elbows 100, such that present-day manufactured fire hydrants can be securely and functionally attached to these old-style elbows 100.

SUMMARY OF THE INVENTION

The foregoing and other features and utilities of the present inventive concept can be achieved by providing an adapter to connect an elbow used with a fire hydrant to a bottom end of a fire hydrant having a different scale, the adapter including: a tubular body including an upper portion, a lower portion, and a molded lip extending outward about an entire circumference of a middle portion of the body between the upper and lower portions thereof; and at least one tube having a first end extending through the molded lip, a body portion extending from the first end along an internal length of the lower portion of the adapter body and a second end extending through an internal surface of the lower portion of the adapter body adjacent to an end thereof.

In an example embodiment, the upper portion of the tubular body can include threads formed circumferentially about an upper inner surface thereof; and the lower portion of the tubular body can include a first set of threads formed circumferentially about an inner portion thereof between the second end of the at least one tube and at a point where the molded lip meets therewith, and a second set of threads formed circumferentially about an outer surface thereof.

In an example embodiment, the tubular body is formed of bronze.

In another example embodiment, the at least one tube is formed of stainless steel.

In still another example embodiment, the at least one tube includes a first tube and a second tube disposed half way around the tubular body from the first tube.

In yet another example embodiment, the inner surface of the upper portion where the threads are formed has a larger circumference than the first set of threads formed about the inner surface of the lower portion thereof.

In still another example embodiment, the upper portion of the tubular body includes a groove formed circumferentially about an upper inner surface thereof to receive an outer surface of a bottom portion of a fire hydrant therein; and the lower portion of the tubular body includes a first set of threads formed circumferentially about an inner portion thereof between the second end of the at least one tube and approximately at a point where the molded lip meets therewith, and a second set of threads formed circumferentially about an outer surface thereof to threat into a fire hydrant elbow.

The foregoing and other features and utilities of the present inventive concept can also be achieved by providing a tubular bronze body, comprising: a molded lip extending outward about an entire circumference of a middle portion thereof; at least one stainless steel tube having a first end extending through a center of the molded lip and a second end extending through an inner surface adjacent one end of the bronze body such that the at least one stainless steel tube extends lengthwise through an inner portion of the bronze body.

In an example embodiment, the tubular bronze body further includes: an upper portion above the molded lip including threads formed circumferentially about an inner surface thereof; and a lower portion below the molded lip including a first set of threads formed circumferentially about an inner portion thereof between the second end of the at least one stainless steal tube and a point where the molded lip meets therewith, and a second set of threads formed circumferentially about an outer surface thereof.

In still another example embodiment, the inner surface of the upper portion where the threads are formed has a larger circumference than the first set of threads formed about the inner surface of the lower portion thereof.

The foregoing and other features and utilities of the present inventive concept can also be achieved by providing a process to form an adapter to adapt a fire hydrant body to a hydrant elbow connected at one end to an underground water pipe, the process comprising: disposing a core within a mask to form a tubular mold, the mask including a lip extending circumferentially about a middle portion thereof extending away from the core and a set of threads extending circumferentially about an outer surface between one side of the lip and one end of the mask, the core having a first set of threads circumferentially about an outer surface extending lengthwise from a first end of the core to a point adjacent to a second side of the lip, and a second set of threads extending lengthwise from the one side of the lip to a point approximately halfway to a second end of the core; disposing a stainless steal tube between the core and mask such that a first end of the stainless steel tube terminates against a portion of the mask within the lip and a second end of the stainless steel tube terminates against the core between the second set of threads in the core and the second end of the core; pouring liquid bronze between the core and the mask; and removing the core and mask after the bronze has cooled to a solid form.

BRIEF DESCRIPTION OF THE DRAWINGS

FIG. 1A illustrates a perspective view of a fire hydrant elbow for an old style conventional fire hydrant;

FIG. 1B illustrates a cross-sectional view of the fire hydrant elbow of FIG. 1A;

FIG. 1C illustrates internal components of a known fire hydrant;

FIG. 5 illustrates a complete assembly of the fire hydrant adapter according to the embodiment of FIG. 2 with a bottom barrel of a modern fire hydrant threaded thereto and an old style conventional fire hydrant elbow threaded thereto.

DETAILED DESCRIPTION OF THE INVENTION

Figure 2:
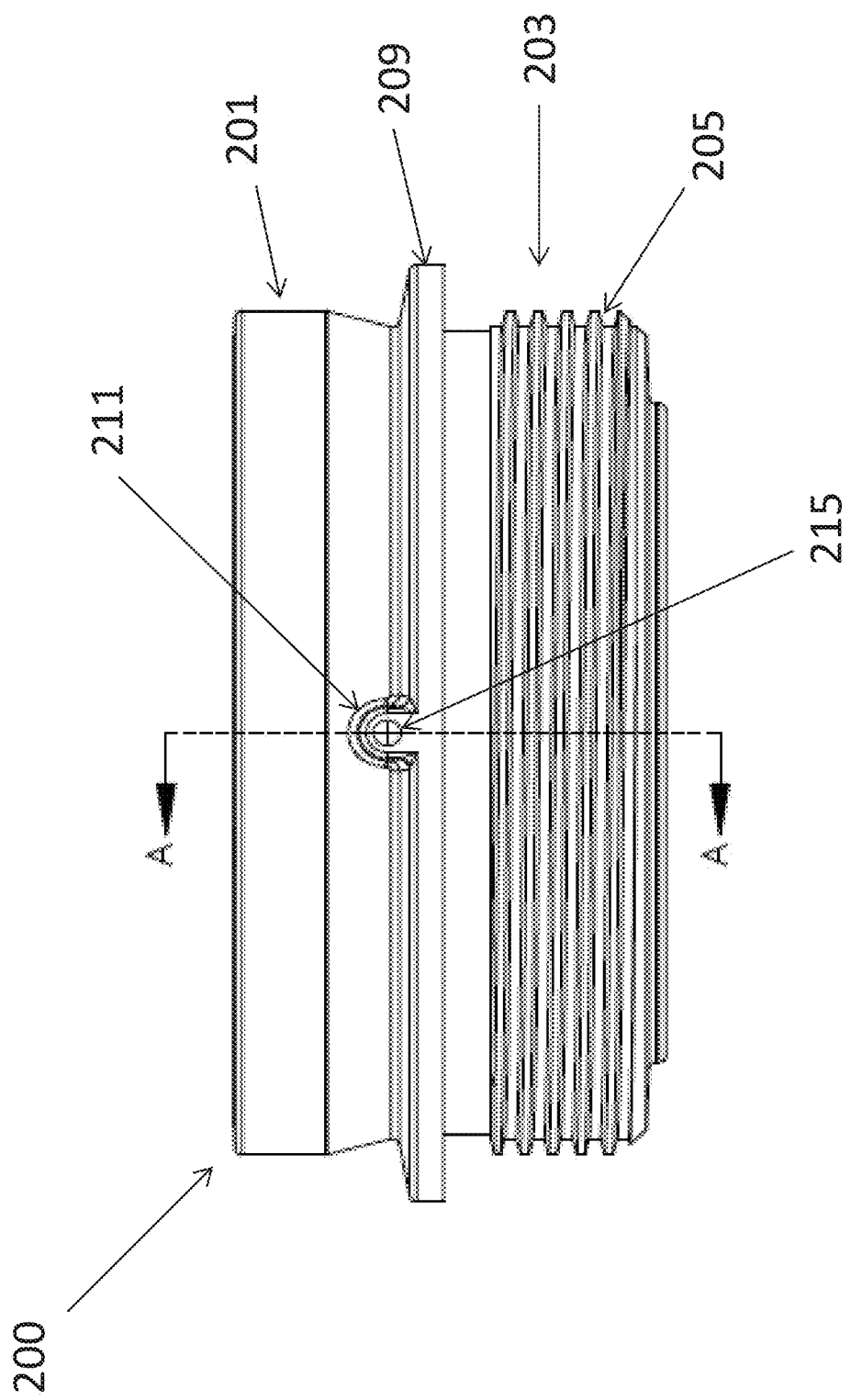
FIG. 2 illustrates a first side view of a fire hydrant adapter according to an example embodiment of the present inventive concept, to connect modern fire hydrants with conventional style elbows used with conventional fire hydrants.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An adapter for fire hydrants can provide the ability to connect modern-day manufactured fire hydrants with the conventional style elbows 100. Conventional fire hydrants and corresponding conventional style elbows manufactured many decades ago, or in some cases even over a century ago, as illustrated in FIGS. 1A through 1B, were manufactured such that a bottom end of the conventional fire hydrants threaded into the corresponding conventional style elbows 100 at threads, such as the threads 105 illustrated in FIGS. 1A through 1B. However, these old-style fire hydrants and corresponding old-style elbows 100 were manufactured at different scales than the modern fire hydrants manufactured presently. As a result, when damage to the old style fire hydrants, such as damage caused by vehicular impact or other blunt forces, corrosion, wear, or other disabling occurrences, renders the exposed portion of the old-style fire hydrants unusable, these old-style fire hydrants require replacement. However, since the elbows (such as conventional elbow 100 in FIGS. 1A and 1B) of the old-style fire hydrant do not extend above ground, and therefore are less likely to be rendered unusable due to protection from corrosion, environmental factors, and being hit by vehicles, replacing these conventional elbows is very costly and often unnecessary. Unfortunately, since the old-style hydrants and elbows were manufactured to a different scale than the more modern fire hydrants, the more modern fire hydrants do not readily fit into the old-style elbows.

FIG. 2 illustrates a fire hydrant adapter 200 according to an example embodiment of the present inventive concept. The adapter 200 is cast molded of bronze in order to provide a high level of resistance to corrosion while also being strong enough to resist damage. Bronze is a product of copper mixed with one of a few other metals, which also resists corrosion. However, due to a mixture of copper with another metal, such as aluminum, bronze is much harder than copper, can withstand being threaded to cast iron parts, and can successfully weather outdoor elements for much longer time periods than other metals, such as solid copper or aluminum. Aluminum alone is also susceptible to pitting.

Figure 3:
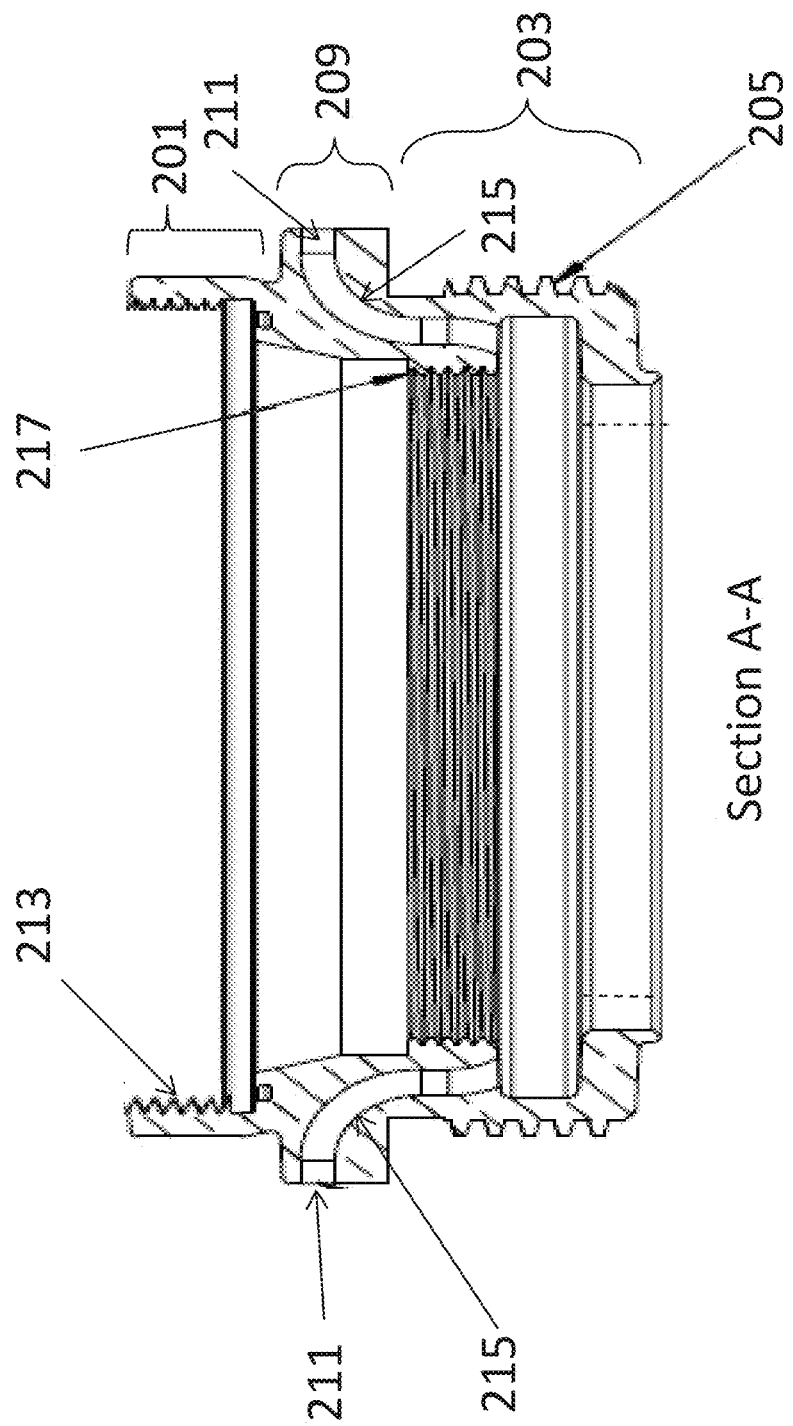
FIG. 3 illustrates a 90 degree rotated cross-sectional view of the fire hydrant adapter illustrated in FIG. 2.

The adapter 200 illustrated in FIG. 2 includes an upper portion 201 and a lower portion 203. The upper portion 201 and lower portion 203 can be cast-molded as a single adapter unit 200 by pouring liquid bronze between an outer mask and an inner core, as will be described in detail below. The final molded product, as illustrated in FIG. 2 and FIG. 3, includes external threads 205 that can thread into the old-style elbows 100 illustrated in FIGS. 1A and 1B. Adjacent to the external threads 205 can be formed a molded lip 209 that sits at a bottom of the second open end 103 of the elbow 100 directly above the threads 105 (see FIG. 1B) of conventional elbows 100.

Old-style elbows 100, such as, for example, one referred to as the Detroit elbow or Traverse elbow, include a pair of drain holes 107 (see FIGS. 1A and 1B) to allow remaining water to drain out from within the fire hydrant once water flow to the hydrant is stopped. Since the threads 205 of the lower portion 203 of the adapter 200 can thread into the threads 105 of the old-style elbows as illustrated in FIGS. 1A and 1B, the drain holes 107 are generally disposed above the adapter 200. To accommodate for the holes 107 and to allow draining of remaining water from within the fire hydrants when the adapter 200 is threaded to the threads 105 of the old-style elbows 100, tubes 215 (illustrated in more detail in FIG. 3) are formed within the bronze adapter 200. These tubes 215 extend at a first end thereof through the outer surface of the adapter 200 and at a second end thereof through an inner surface of the adapter 200. Each tube 215 has the first end terminating at a respective port 211, which can be formed to extend through the molded lip 209 to allow any remaining water within the fire hydrants to drain out after water flow to the hydrants has been closed off.

Figure 4:
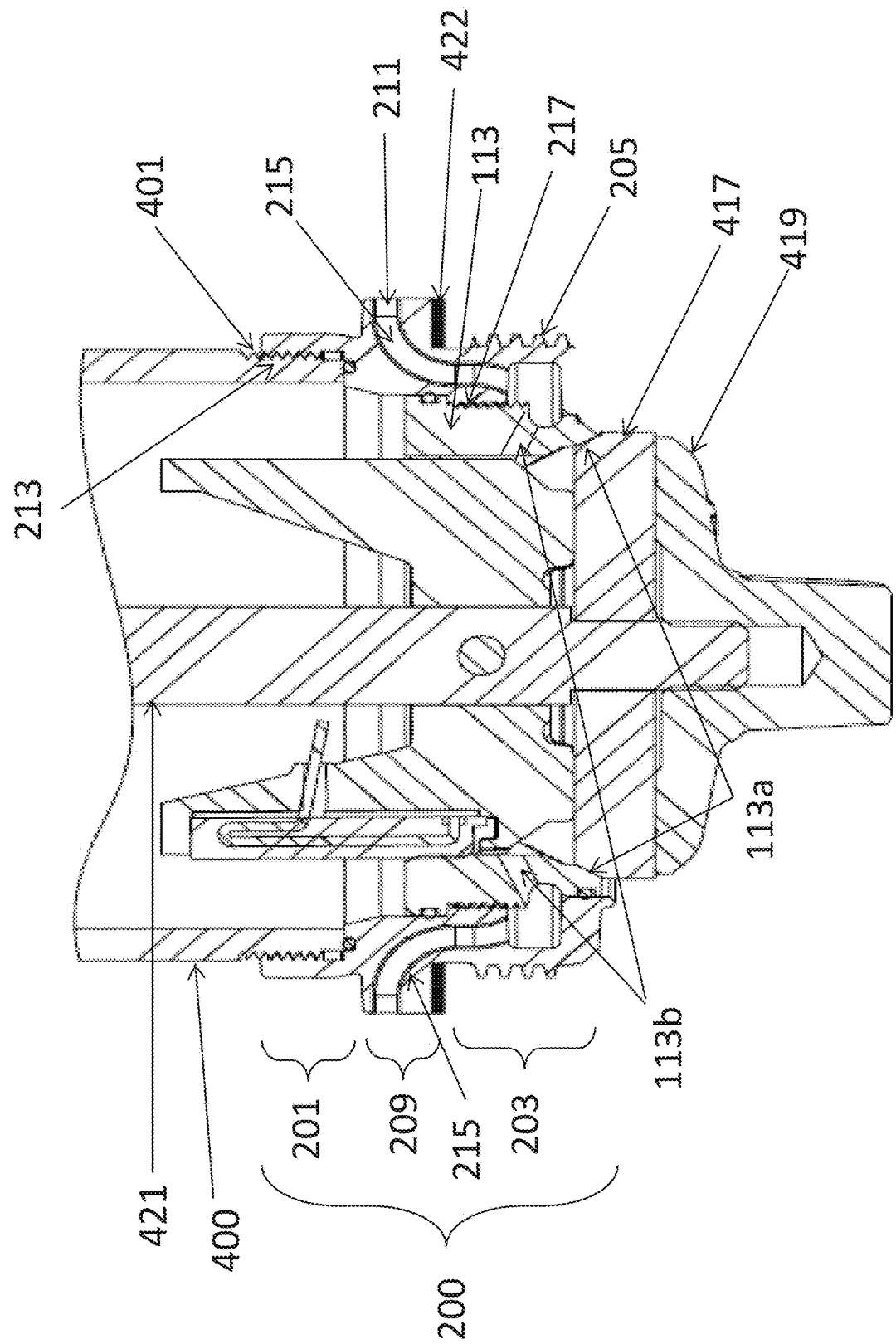
FIG. 4 illustrates the fire hydrant adapter according to the embodiment of FIG. 2 with a bottom barrel of a modern fire hydrant threaded thereto.

FIG. 3 illustrates a cross-sectional view of the fire hydrant adapter 200 of FIG. 2 rotated by 90 degrees, and FIG. 4 illustrates the fire hydrant adapter 200 of FIG. 2 threaded to a bottom barrel 400 of a modern fire hydrant. Referring to FIG. 3 and FIG. 4, the second end of the tubes 215 connect the respective ports 211 of the tubes 215 to an inside of the fire hydrant through holes 113b extending through the seat ring 113 such that when water drains through the holes 113b (See FIG. 4) and the tubes 215, the water continues to drain out of the holes 107 in the elbow 100 to a sufficiently low level to prevent damage from freezing.

The tubes 215 can be formed of stainless steel such that as the adapter 200 is being molded and is in a hot liquid bronze state, the stainless steel tubes 215 can withstand the hot molten liquid and contain their form and shape while the liquid bronze cools to a solid state. As illustrated in FIG. 3 and FIG. 4, the upper portion 201 can include threads 213 around the circumference of an inner portion thereof to receive threads of a bottom barrel of a fire hydrant. Also illustrated in FIG. 3 and FIG. 4 is a seat ring 113 threaded into threads 217 formed circumferentially about an inner surface of the bottom portion 203 of the adapter 200. Another benefit of using bronze for the adapter 200 of the present inventive concept is that bronze provides for a more precision machining than iron allows during casting, thus providing a more precision fit and better repetition in threading and unthreading the adapter 200 with respect to elbows, hydrants, etc.

Application of the adapter 200 between the old-style elbows 100 and modern fire hydrants is described below.

The threads 205 of the adapter 200 can be threaded into the threads 105 of the old-style elbow 100 to form a tight seal therebetween. Since the adapter 200 is formed of bronze, the threads 205 can resist wear and damage that would otherwise be caused by forces that can occur during threading a softer material into the cast iron elbows 100. Once the adapter 200 is fully threaded into the elbow 100, the tubes 215 can drain any water remaining in the fire hydrant after the flow of water into the hydrant has stopped.

The seat ring 113 can then be threaded into the threads 217 of the adapter 200 after the adapter 200 is threaded to the elbow 100. The O-rings 115 (FIG. 1C) can provide a seal between the outer bottom edge of the seat ring 113 and the inner surface of the elbow 100 to prevent any water from escaping between the threads of the seat ring 113 and the threads 217 of the adapter 200. The seat ring 113 has two holes 113b (see FIG. 4) that drain remaining water out of the bottom barrel into the adapter 200, which drains remaining water through the stainless steel tubes 215 and out to the second open end 103 of the elbow 100.

The seat ring 113 also has a tapered seat 113a (see FIG. 4) at a bottom circumference thereof in which an outer periphery of a main valve 417 is forced against when the main valve 417 is positioned in a fully closed state, thus preventing any additional flow of water into the hydrant from an underground water source. When the main valve 417 is seated against the tapered seat 113a of the seat ring 113, as illustrated in FIG. 4, most of the water remaining above the main valve 417 can drain out through the holes 113b in the seat ring 113, through the respective aligned tubes 215 and out of the ports 211, thus preventing any damage that could otherwise be caused by freezing of the water within the hydrant.

As illustrated in FIG. 4, a stem 421 of the fire hydrant extends through the adapter 200 and the main valve 417, and connects with a bottom plate 419. When the stem 421 is rotated to draw the bottom plate 419 and the main valve 417 toward the seat ring 113, the main valve 417 is pushed up against the tapered bottom edge 113a of the seat ring 113, thus closing off the water flow into the fire hydrant's lower barrel. Once the seat ring 113 is fully threaded to the adapter threads 217, the pair of seat ring holes 113b becomes aligned with respective second ends of the stainless steel tubes 215. At this point any remaining water in the fire hydrant's bottom barrel 400 can drain out through the holes 113b in the seat ring 113 and subsequently through the stainless steel tubes 215, thus fully draining the fire hydrant lower barrel 400 of any remaining water therein. A gasket 422 is placed circumferentially around the lower portion 203 of the adapter 200 and against a side of the lip 209 to provide a secure fit between the lip 209 and the bottom portion of the second open end 103 of the elbow 100 directly above the threads 105.

FIG. 5 illustrates a fully assembled adapter 200 with the bottom barrel 400 of a fire hydrant and the elbow 100. More specifically, the threads 205 of the adapter 200 are threaded to the threads 105 of the old-style elbow 100 while the threads 213 of the adapter 200 are threaded to the threads 401 of the bottom barrel 400 of the fire hydrant. The bottom barrel 400 of the fire hydrant is illustrated to be in the fully closed position, where the main valve 417 is pressed against the seat 113a of the seat ring 113. The gasket 422 is pressed between the one side of the lip 209 and the bottom portion of the second open end 103 of the elbow 100 as the adapter 200 is fully threaded to the elbow 100. The threads 213 of the adapter 200 are also threaded to the threads 401 of the bottom barrel 400. Thus, if any remaining water is inside the bottom barrel 400 of the fire hydrant after the main valve 417 is closed, this water will flow through the holes 113b of the seat ring 113, up through the aligned stainless steel tubes 215, out of the respective ports 211 and out of the holes 107 of the elbow 100.

According to another embodiment of the present inventive concept, the adapter may be manufactured by forming a tubular mold including a specifically designed core being disposed within a specifically designed mask. The mask can include a lip extending circumferentially about approximately a middle portion thereof and away from the core therein. The lip of the mask can include at least one port hole extending through the lip of the mask. The core can also include at least one port hole extending therethrough corresponding with the at least one port hole in the mask. The at least one port hole in the core is disposed at a bottom end of the core below the lip of the mask as the core is disposed within the mask such that a flow of liquid from the at least one port hole in the core to the at least one port hole in the mask would flow uphill.

A stainless steal tube can then be disposed between the core and mask such that a first circumferential end of the stainless steel tube extends through a corresponding at least one port hole in the mask at the lip and a second circumferential end of the stainless steel tube extends through a corresponding ate least one port hole in the core. Another stainless steel tube can be disposed 180 degrees around the core and mask through another one of the corresponding at least port hole in the mask and another one of the corresponding at least one port hole in the core in the same way as the first stainless steel tube. After the stainless steel tube(s) are disposed between the core and mask and extending through the corresponding port holes in the mask and core, a liquid molten bronze can be poured between the core and the mask. Once the bronze cools to a solid state, the core and mask can be removed from the solid state tubular bronze adapter and ends of the stainless steel tube(s) can be cut to be flush with the outer and inner surfaces of the adapter. The resulting adaptor will have at least one stainless steel tube extending through the body such that the first end of the at least one tube will extend through the lip in the mask and the second end of the at least one tube will extend through a bottom area of the core, such that water flow from the port hole through the core will flow uphill and through the port hold through the lip of the mask.

Machining of the adapter can be performed to provide threads for the adapter as desired by processes such as lathing.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An adapter to connect an elbow used with a fire hydrant to a bottom end of a fire hydrant having a different scale, the adapter comprising:
    a tubular body including an upper portion, a lower portion, and a molded lip extending outward about an entire circumference of a middle portion of the tubular body between the upper portion and the lower portion thereof; and
    at least one tube having a first end extending through the molded lip, a body portion extending from the first end along an internal length of the lower portion of the adapter body and a second end extending through an internal surface of the lower portion of the adapter body adjacent to an end thereof,
    the upper portion of the tubular body including threads formed circumferentially about an upper inner surface thereof,
    the lower portion of the tubular body including a first set of threads formed circumferentially about an inner portion thereof between the second end of the at least one tube and at a point where the molded lip meets therewith, and a second set of threads formed circumferentially about an outer surface thereof.

2. The adapter of claim 1, wherein the tubular body is formed of bronze.

3. The adapter of claim 2, wherein the at least one tube is formed of stainless steel.

4. The adapter of claim 3, wherein the at least one tube includes a first tube and a second tube disposed half way around the tubular body from the first tube.

5. The adapter of claim 1, wherein the at least one tube is formed of stainless steel.

6. The adapter of claim 1, wherein the inner surface of the upper portion where the threads are formed has a larger circumference than the first set of threads formed about the inner surface of the lower portion thereof.

7. The adapter of claim 1, wherein:
the upper portion of the tubular body includes a groove formed circumferentially about an upper inner surface thereof to receive an outer surface of a bottom portion of a fire hydrant therein; and
the second set of threads formed circumferentially about the outer surface thereof to thread into a fire hydrant elbow.

8. A tubular bronze body, comprising:
a molded lip extending outward about an entire circumference of approximately a middle portion thereof;
at least one stainless steel tube having a first end extending through a center of the molded lip and a second end extending through an inner surface adjacent one end of the bronze body such that the at least one stainless steel tube extends lengthwise through an inner portion of the bronze body;
an upper portion above the molded lip including threads formed circumferentially about an inner surface thereof;
a lower portion below the molded lip including a first set of threads formed circumferentially about an inner portion thereof between the second end of the at least one stainless steel tube and a point where the molded lip meets therewith; and
a second set of threads formed circumferentially about an outer surface thereof.

9. The tubular bronze body of claim 8, wherein the inner surface of the upper portion where the threads are formed has a larger circumference than the first set of threads formed about the inner surface of the lower portion thereof.

10. An adapter to connect an elbow used with a fire hydrant to a bottom end of a fire hydrant having a different scale, the adapter comprising:
a tubular body including an upper portion, a lower portion, and a molded lip extending outward about an entire circumference of a middle portion of the body between the upper and lower portions thereof; and
at least one tube having a first end extending through the molded lip, a body portion extending from the first end along an internal length of the lower portion of the adapter body and a second end extending through an internal surface of the lower portion of the adapter body adjacent to an end thereof,
the upper portion of the tubular body including a groove formed circumferentially about an upper inner surface thereof to receive an outer surface of a bottom portion of a fire hydrant therein;
the lower portion of the tubular body including a first set of threads formed circumferentially about an inner portion thereof between the second end of the at least one tube and approximately at a point where the molded lip meets therewith, and a second set of threads formed circumferentially about an outer surface thereof to thread into a fire hydrant elbow.

11. A process of forming an adapter to adapt a fire hydrant body to a hydrant elbow connected at one end to an underground water pipe, the process comprising:
disposing a core within a mask to form a tubular mold defining an upper portion, a lower portion, and a middle portion, the mask including a lip extending about an entire circumference of the middle portion thereof extending away from the core, the mask including at least one hole extending through the lip and the core including at least one hole through a lower portion thereof and aligned vertically with the at least one hole in the lip of the mask;
disposing a tube between the core and the mask such that a first end of the tube extends through the at least one hole extending through the lip, such that a second end of the tube extends through the at least one hole through a lower portion of the core, and such that a body portion extends from the first end along an internal length through the middle portion of the tubular mold and the lower portion of the tubular mold to the second end;
pouring liquid bronze between the core and the mask;
removing the core and mask after the bronze has cooled to a solid adapter;
forming first threads around an internal surface of the adapter at the upper portion opposite the lower portion, forming the first threads around the internal surface of the adapter beginning above the at least one hole in the core and ending approximately where the lip extends outward thereof;
forming second threads circumferentially about a lower radially inwardly facing surface of the lower portion of the adapter between the second end of the tube and a point where the molded lip meets therewith; and
forming third threads circumferentially about an outer surface of the lower portion of the adapter.

12. The process according to claim 11, further comprising cutting of the first end and the second end of the tube such that the ends of the tube are flush with their respective surfaces of the adapter.

* * * * *